United States Patent Office 3,163,627
Patented Dec. 29, 1964

3,163,627
MODIFIED POLYESTER RESINS
John Kenneth Craver, Dayton, Ohio, assignor to Monsanto Company, a corporation of Delaware
No Drawing. Filed June 6, 1957, Ser. No. 663,868
17 Claims. (Cl. 260—861)

This invention relates to new and novel polymerizable compositions and to resinous products obtained therefrom, the polymerizable compositions comprising (A) a polymerizable linear polyester comprising the residues of a dihydroxy aliphatic compound and a dicarboxylic acid having ethylenic unsaturation which are also referred to as unsaturated polyester chain resins, (B) an unsaturated cross-linking agent characterized by the grouping $$CH_2=C<$$

and (C) a bis(alkyl) vinylphosphonate which imparts flame retardant properties.

The production of infusible, insoluble $CH_2=C<$ modified unsaturated polyester chain resins which are flame retardant is of considerable commercial importance. For example, castings, moldings, foamed articles or laminated structures bonded by such resins are for many uses required to be resistant to fire. Typical illustrations of applications having such requirements is had in castings for live electrical contacts, pipes, wall coverings, panels, and the like.

In accordance with this invention it has been found that a polymerizable mixture comprising an unsaturated polyester chain resin, an unsaturated cross-linking agent characterized by the grouping $CH_2=C<$, and a bis(alkyl) vinylphosphonate is cured such provides a resinous composition which is highly resistant to burning and yet possesses many of the desirable characteristics usually associated with $CH_2=C<$ compound modified unsaturated polyester chain resins.

The unsaturated polyester chain resins of this invention comprise the residues of about 50 chemical equivalents of a dihydroxy aliphatic compound and about 50 chemical equivalents of an ethylenically unsaturated aliphatic dicarboxylic acid or 50 chemical equivalents of a mixture of an ethylenically unsaturated dicarboxylic acid with a saturated aliphatic dicarboxylic acid or aromatic dicarboxylic acid. The preparation of such resins is well known, but ordinarily a dihydric aliphatic alcohol is condensed with the dicarboxylic acid or its anhydride in the presence of a condensation catalyst, the dihydric aliphatic alcohol being employed in excess of that theoretically required. Ordinarily the condensation is carried out at elevated temperatures (e.g. 150–250° C.) until an acid number of 10 to 125 is obtained.

The dihydroxy aliphatic compound employed in preparation of the unsaturated polyester chain resin of this invention is preferably propylene glycol, however such may be replaced in whole or in part by such dihydroxy aliphatic compounds as ethylene glycol, 2,3-butylene glycol, 2,3-amylene glycol, trimethylene glycol, 1,3-butylene glycol, tetramethylene glycol, diethylene glycol, triethylene glycol, and the like. It is preferred that the dihydroxy aliphatic compound contain not more than 6 carbon atoms.

The ethylenically unsaturated aliphatic dicarboxylic acid or anhydride preferably employed is maleic acid or its anhydride, but such may be replaced in whole or in part by other unsaturated acids such as fumaric acid, citraconic acid, mesaconic acid, dimethyl maleic acid, methyl ethyl maleic acid, and the like, or their anhydrides. It is preferred that the ethylenically unsaturated aliphatic dicarboxylic acid or its anhydride contain not more than 8 carbon atoms. The ethylenically unsaturated aliphatic dicarboxylic acid may be replaced in part (e.g. 40 to 80 mol percent thereof) by either a saturated aliphatic dicarboxylic acid (or its anhydride) containing at least 4 carbon atoms or an aromatic dicarboxylic acid (or its anhydride) or mixture thereof.

Among the saturated aliphatic dicarboxylic acids which may be employed are succinic acid or its anhydride, glutaric acid, adipic acid and pimelic acid. It is preferred that the saturated aliphatic dicarboxylic acid contain not more than 8 carbon atoms.

Among the aromatic dicarboxylic acids or their anhydrides which may be employed are phthalic acid, isophthalic acid, terephthalic acid, the various mono-, di-, tri- and tetra-chlorophthalic acids, and the like. It is preferred that the aromatic dicarboxylic acid contain not more than 10 carbon atoms.

The cross-linking agents of this invention are characterized by the grouping $CH_2=C<$ and comprise vinyl aromatic compounds, vinyl esters, e.g. vinyl esters of lower aliphatic acids, and particularly vinyl esters of short chain fatty acids (i.e. those having not over 4 carbon atoms) and esters having the formula $$CH_2=CRCOOR_1$$

wherein R is hydrogen or $CH_3$ and $R_1$ is an alkyl group having not over 4 carbon atoms. Examples of vinyl aromatic compounds which may be used are styrene, paramethyl styrene, meta ethyl styrene, propyl styrene, ethyl methyl styrene, ortho chloro styrene, parachlorostyrene, dichlorostyrenes, for example, 2,5-dichlorostyrene, 1,2-dichlorostyrene, 2,4-dichlorostyrene, 3,4-dichlorostyrene, para-phenyl styrene, divinyl benzenes, such as paradivinyl benzene, vinyl naphthalene and the like. Examples of vinyl esters of lower aliphatic acids which may be used in the compositions of the invention include vinyl formate, vinyl acetate, vinyl propionate, vinyl butyrate, vinyl lactate, vinyl glycollate and the like. Examples of esters of acrylic and methacrylic acids include the methyl, ethyl, propyl and butyl esters of the acids. Of the foregoing copolymerizable compounds the vinyl aromatic compounds are preferred and particularly vinyl derivatives of aromatic compounds having a single benzene ring.

By a "bis(alkyl) vinylphosphonate" is meant a compound of the structure $$X_1-C=C-P-(OCH_2RX)_2$$
$$\phantom{X_1-}|\phantom{=}|\phantom{-P}\|$$
$$\phantom{X_1-C=}X_2\phantom{=}X_3\phantom{-P}O$$

wherein X, $X_1$, $X_2$ and $X_3$ are either chlorine or hydrogen and wherein R is a short chain saturated alkylene radical having the empirical formula $C_nH_{2n}$ wherein $n$ is a whole number (i.e. containing 1 to 4 carbon atoms such as $CH_2$, $C_2H_4$, $CH(CH_3)$, $C_3H_6$, $C_2H_3(CH_3)$, and $C_4H_8$). As illustrative of such are Bis($\beta$-chlorethyl) vinylphosphonate
Bis($\beta$-chlorpropyl) vinylphosphonate
Bis($\beta$-chlorethyl) 2-chlorvinylphosphonate
Bis($\beta$-chlorethyl) 2,2-dichlorvinylphosphonate
Bis(ethyl) vinylphosphonate
Bis(isobutyl) vinylphosphonate The polymerizable compositions of this invention, i.e. the mixture comprising an unsaturated polyester chain resin, a cross-linking agent characterized by the grouping $CH_2=C<$, and a bis(alkyl) vinylphosphonate, may be conveniently stored by incorporating therein a polymerization inhibitor or preferably to one of the components prior to mixing. In that most cross-linking agents characterized by the grouping $CH_2=C<$ in monomer form contain a polymerization inhibitor advantage may readily be taken by admixing same with the aforesaid components without fear of premature polymerization in storage or in shipping.

The polymerizable composition of this invention is readily cured by heating. In general, however, polymerization is carried out in the presence of a catalytic amount of a free radical initiator. Examples of catalysts which may be used are well known, but it is preferred that benzoyl peroxide, succinic peroxide, lauroyl peroxide, stearoyl peroxide, coconut oil acid peroxide, tert. butyl hydroperoxide, and like organic peroxide free radical initiators be employed. Usually only small amounts of the polymerization catalyst need be used, e.g. a catalytic amount in the range of 0.05 to 3% by weight based on the polymerizable composition, i.e. unsaturated polyester chain resin-$CH_2$=C< compound-bis(alkyl) vinylphosphonate.

The temperature at which the mixture of unsaturated polyester chain resin-$CH_2$=C< compound-bis(alkyl) vinylphosphonate-catalyst is polymerized may vary widely. When large quantities of catalysts are employed, the polymerization may take place at room temperature. Generally, and where possible, it is desirable to employ higher temperatures in order to shorten the polymerization time, e.g. 50° C. to 200° C.

The invention is described hereinafter with respect to the preferred $CH_2$=C< compound, namely, styrene, and the preferred bis(alkyl) vinylphosphonate, namely bis(β-chlorethyl) vinylphosphonate; however such is not to be construed as limitative thereof:

EXAMPLE A

An unsaturated polyester chain resin is prepared by heating the following charge at 200° C. until the acid number is about 30 to 40:

| | Mols |
|---|---|
| Adipic acid | 0.6 |
| Maleic anhydride | 1.4 |
| Propylene glycol | [1]2.4 |

[1] 20% mol excess.

At the end of the condensation reaction the mass is cooled. The product is a viscous liquid unsaturated polyester chain resin.

EXAMPLE B 100 parts by weight of the resin of Example A is blended with 50 parts by weight of styrene and thereto is added 1.5 parts by weight of benzoyl peroxide. This mix is then heated in the mold at 70° C. for one hour, followed by heating at 125° C. for one hour and cooled to provide a sheet of 0.125 inch thickness.

*Example I*

[20 mol percent of styrene of Example B replaced by molar equivalent of bis(β-chlorethyl) vinylphosphonate]

100 parts by weight of the resin of Example A is blended with 40 parts by weight of styrene, 31.3 parts by weight of bis(β-chlorethyl) vinylphosphonate, and 1.7 parts by weight of benzoyl peroxide. The mix is then heated in a mold at 70° C. for one hour, followed by heating at 125° C. for one hour, and cooled to provide a sheet of 0.125 inch thickness.

*Example II*

[25 mol percent of styrene of Example B replaced by molar equivalent of bis(β-chlorethyl) vinylphosphonate]

100 parts by weight of the resin of Example A is blended with 37.5 parts by weight of styrene 39.2 parts by weight of bis(β-chlorethyl) vinylphosphonate, and 1.8 parts by weight of benzoyl peroxide. The mix is then heated in a mold at 70° C. for one hour, followed by heating at 125° C. for one hour, and cooled to provide a sheet of 0.125 inch thickness.

*Example III*

[50 mol percent of styrene of Example B replaced by molar equivalent of bis(β-chlorethyl) vinylphosphonate]

100 parts by weight of the resin of Example A is blended with 25 parts by weight of styrene, 78.4 parts by weight of bis(β-chlorethyl) vinylphosphonate, and 2.2 parts by weight of benzoyl peroxide. The mix is then heated in a mold at 70° C. for one hour, followed by heating at 125° C. for one hour, and cooled to provide a sheet of 0.125 inch thickness.

The properties of the resins of Examples B, I, II, and III are as follows:

| | B | I | II | III |
|---|---|---|---|---|
| Flammability, in./min | 1.0 | [1]SE | [1]SE | [1]SE |
| Light stability-(Fadeometer) Reflectance, original | 92 | 91 | 89 | 92 |
| Reflectance after 300 hrs | 75 | 75 | 83 | 83 |

[1] SE—Self-extinguishing (i.e. when the resin sheet is removed from the flame it ceases burning).

To further illustrate this invention is the following:

EXAMPLE C

An unsaturated polyester chain resin is prepared by heating the following charge at 200° C. until the acid number is about 30 to 40:

| | Mols |
|---|---|
| Phthalic anhydride | 1.0 |
| Maleic anhydride | 1.0 |
| Proplyene glycol | [1]2.4 |

[1] 20% mol excess.

At the end of the condensation reaction the mass is cooled. The product is a viscous liquid unsaturated polyster chain resin.

EXAMPLE D 100 parts by weight of the resin of Example C is blended with 50 parts by weight of styrene and thereto is added 1.5 parts by weight of benzoyl peroxide. This mix is then heated in a mold of 70° C. for one hour, followed by heating at 125° C. for one hour, and cooled to provide a sheet of 0.125 inch thickness.

*Example IV*

[10 mol percent of styrene of Example D replaced by molar equivalent of bis(β-chlorethyl) vinylphosphonate]

100 parts by weight of the resin of Example C is blended with 45 parts by weight of styrene, 15.7 parts by weight of bis(β-chlorethyl) vinylphosphonate, and 1.7 parts by weight of benzoyl peroxide. This mix is then heated in a mold of 70° C. for one hour followed by heating at 125° C. for one hour, and cooled to provide a sheet of 0.125 inch thickness.

*Example V*

[15 mol percent of styrene of Example D replaced by molar equivalent of bis(β-chlorethyl) vinylphosphonate]

100 parts by weight of the resin of Example C is blended with 42.5 parts by weight of styrene, 23.3 parts by weight of bis(β-chlorethyl) vinylphosphonate, and 1.8 parts by weight of benzoyl peroxide. The mix is then heated in a mold at 70° C. for one hour, followed by heating at 125° C. for one hour, and cooled to provide a sheet of 0.125 inch thickness.

*Example VI*

[15 mol percent of styrene of Example D replaced by molar equivalent of bis(ethyl) vinylphosphonate]

100 parts by weight of the resin of Example C is blended with 42.5 parts by weight of styrene, 18.4 parts by weight of bis(ethyl) vinylphosphonate, and 1.8 parts by weight of benzoyl peroxide. The mix is then heated in a mold of 70° C. for one hour, followed by heating at 125° C. for one hour, and cooled to provide a sheet of 0.125 inch thickness.

EXAMPLE E

[15 mol percent of styrene of Example D replaced by molar equivalent of diallyl phenylphosphonate described in U.S. 2,497,637]

100 parts by weight of the resin of Example C is blended with 42.5 parts by weight of styrene, 23.7 parts by weight of diallyl phenylphosphonate, and 1.8 parts by weight of benzoyl peroxide. The mix is then heated in a mold at 70° C. for one hour, followed by heating at 125° C. for one hour, and cooled to provide a sheet of 0.125 inch thickness.

The properties of the resins of Examples D, IV, V, VI and E are as follows:

|  | D | IV | V | VI | E |
|---|---|---|---|---|---|
| Flammability, in./min | 0-46 | ¹SE | ¹SE | ¹SE | 0-3 |

¹ SE—Self-extinguishing.

Other specific base polyester resins may be employed than that of Examples I, II, III, IV, V, VI, and E, for example the unsaturated polyester resins obtained by heating the following charges at 150 to 250° C. until an acid number in the range of 10 to 75 is obtained:

(1)

| | Mols |
|---|---|
| Phthalic anhydride | 0.6 |
| Succinic anhydride | 0.2 |
| Maleic anhydride | 1.2 |
| Propylene glycol | ¹2.2 |

(2)

| | |
|---|---|
| Phthalic anhydride | 0.6 |
| Maleic anhydride | 1.4 |
| Ethylene glycol | ²2.3 |

(3)

| | |
|---|---|
| Phthalic anhydride | 0.8 |
| Fumaric acid | 1.2 |
| Propylene glycol | ³2.4 |

(4)

| | |
|---|---|
| Maleic anhydride | 1.0 |
| Propylene glycol | 1.2 |

¹ 10% excess.
² 15% excess.
³ 20% excess.

While the amounts of unsaturated polyester chain resin, cross-linking agent characterized by the grouping $$CH_2=C<$$

and bis(alkyl) vinylphosphonate in the polymerizable composition of this invention may vary widely in general from 15 to 75 parts by weight but preferably 25 to 50 parts by weight of the cross-linking agent characterized by the grouping $CH_2=C<$ are used per 100 parts of unsaturated polyester chain resin. Any flame retardant amount of bis(alkyl) vinylphosphonate may be used but in general 0.1 to 1.0 mol but preferably 0.25 to 0.35 mol thereof per mol of the cross-linking agent provide optimum results.

It is to be understood that the description of this invention set forth hereinabove is illustrative thereof and that modifications and variations thereof obvious to those skilled in the art may be made without departing from the spirit or scope of this invention, e.g. up to 10% of the dihydric alcohol may be replaced by such monohydric alcohols as methanol, ethanol, propanol, butanol, pentanol, octyl alcohol, allyl alcohol, etc., and up to 10% of the total dibasic acid content may be replaced by such monobasic acids as acetic acid, propionic acid, formic acid, benzoic acid, acrylic acid, or such polybasic acids as aconitic acid, citric acid, etc.

What is claimed is:

1. A polymerizable composition of matter comprising from about 60 to 90 parts of (1) an unsaturated linear polyester obtained by the esterification of an alpha,beta-ethylenically unsaturated dicarboxylic acid and a saturated dihydric alcohol, said polyester having an acid number not greater than about 55, and correspondingly from about 40 to 10 parts of (2) a mixture of (A) a monomeric compound containing a $CH_2=C<$ group and having a boiling point of at least 60° C.; and from about 5 to 30%, based on the total weight of the polymerizable composition, of (B) a vinyl phosphonate containing at least one chlorine atom and having the structural formula:

$$\begin{array}{c} R^1O \\ \phantom{x} \diagdown \\ \phantom{xxx} P \\ \phantom{x} \diagup \phantom{x} \diagdown \\ R^2O \phantom{xxxx} O \end{array} \begin{array}{c} CH=CH_2 \end{array}$$

wherein $R^1$ and $R^2$ each represent the same chlorinated alkyl radicals containing from 2 to 4 carbon atoms; with the proviso that the ratio of said (A) to said (B) shall be not less than about 1:2 respectively.

2. A polymerizable composition of matter comprising (A) a polymerizable linear polyester comprising a polyester obtained by the esterification of an alpha,beta-ethylenically unsaturated aliphatic dicarboxylic acid and a saturated dihydric alcohol, (B) from 15 to 75 parts by weight per 100 parts by weight of linear polyester of a cross-linking agent characterized by the grouping $CH_2=C<$ selected from the group consisting of vinyl aromatic compounds, vinyl esters of fatty acids having from 1 to 4 carbon atoms, and esters having the formula $$CH_2=CRCOOR'$$

wherein R is selected from the group consisting of hydrogen and $CH_3$ and R' is an alkyl group having from 1 to 4 carbon atoms, and (C) from 0.1 to 1.0 mol, per mol of cross-linking agent, of a bis(alkyl) vinylphosphonate of the structure $$X_1-C=C-P(OCH_2R''X)_2 \atop \phantom{xx} X_2 \phantom{x} X_3 \phantom{xx} O$$

wherein X, $X_1$, $X_2$ and $X_3$ are selected from the group consisting of chlorine and hydrogen and wherein R'' is an alkylene radical having from 1 to 4 carbon atoms.

3. A composition of claim 2 wherein the bis(alkyl) vinylphosphonate is bis(beta-chloroethyl) vinylphosphonate.

4. A composition of claim 3 wherein the cross-linking agent is a vinyl aromatic compound.

5. A composition of claim 4 wherein the vinyl aromatic compound is styrene.

6. A composition of claim 4 wherein the polymerizable liner polyester is that obtained by the esterification of a saturated dihydric alcohol containing not more than six carbon atoms and an alpha,beta-ethylenically unsaturated aliphatic dicarboxylic acid containing not more than eight carbon atoms.

7. A composition of claim 4 wherein the polymerizable linear polyester comprises a polyester obtained by the esterification of a dihydric alcohol containing not more than 6 carbon atoms with a mixture of an alpha,beta-ethylenically unsaturated aliphatic dicarboxylic acid containing not more than 8 carbon atoms and a saturated aliphatic dicarboxylic acid, the said mixture containing from 20 to 60 mol percent of the said ethylenically unsaturated aliphatic dicarboxylic acid.

8. A composition of claim 4 wherein the polymerizable linear polyester comprises a polyester obtained by the esterification of a dihydric alcohol containing not more than 6 carbon atoms with a mixture of an alpha,beta-ethylenically unsaturated aliphatic dicarboxylic acid containing not more than 8 carbon atoms and an aromatic dicarboxylic acid containing not more than 10 carbon atoms, the said mixture containing from 20 to 60 mol percent of the said ethylenically unsaturated aliphatic dicarboxylic acid.

9. A composition of claim 5 wherein the polymerizable linear polyester is that obtained by the esterification of propylene glycol with a mixture of maleic acid and adipic acid, the said mixture containing from 20 to 60 mol percent of maleic acid.

10. A composition of claim 6 wherein the polymerizable linear polyester is that obtained by the esterification of propylene glycol with a mixture of maleic acid and phthalic acid, the said mixture containing from 20 to 60 mol percent of maleic acid.

11. A resin obtained by heating a composition of claim 2.

12. A resin obtained by heating a composition of claim 4 in the presence of a catalytic amount of an organic peroxide.

13. A resin obtained by heating a composition of claim 5 in the presence of a catalytic amount of an organic peroxide.

14. A resin obtained by heating a composition of claim 7 in the presence of a catalytic amount of an organic peroxide.

15. A resin obtained by heating a composition of claim 8 in the presence of a catalytic amount of an organic peroxide.

16. A resin obtained by heating a composition of claim 9 in the presence of a catalytic amount of an organic peroxide.

17. A resin obtained by heating a composition of claim 10 in the presence of a catalytic amount of an organic peroxide.

References Cited in the file of this patent
UNITED STATES PATENTS

| 2,714,100 | Toy et al. | July 26, 1955 |
| 2,931,746 | Robitshek et al. | Apr. 5, 1960 |

OTHER REFERENCES

Kosolapoff: Chemical Abstracts, vol. 42, No. 12, pp. 4132(i), June 20, 1948.

UNITED STATES PATENT OFFICE
CERTIFICATE OF CORRECTION

Patent No. 3,163,627                 December 29, 1964

John Kenneth Craver

It is hereby certified that error appears in the above numbered patent requiring correction and that the said Letters Patent should read as corrected below.

Column 5, in the first chart, second column, line 1 thereof, for "0-46" read -- 0.46 --; same chart, sixth column, line 1 thereof, for "0-3" read -- 0.3 --; column 6, line 54, for "liner" read -- linear --.

Signed and sealed this 6th day of July 1965.

(SEAL)
Attest:

ERNEST W. SWIDER                 EDWARD J. BRENNER
Attesting Officer                 Commissioner of Patents